Patented Jan. 14, 1936

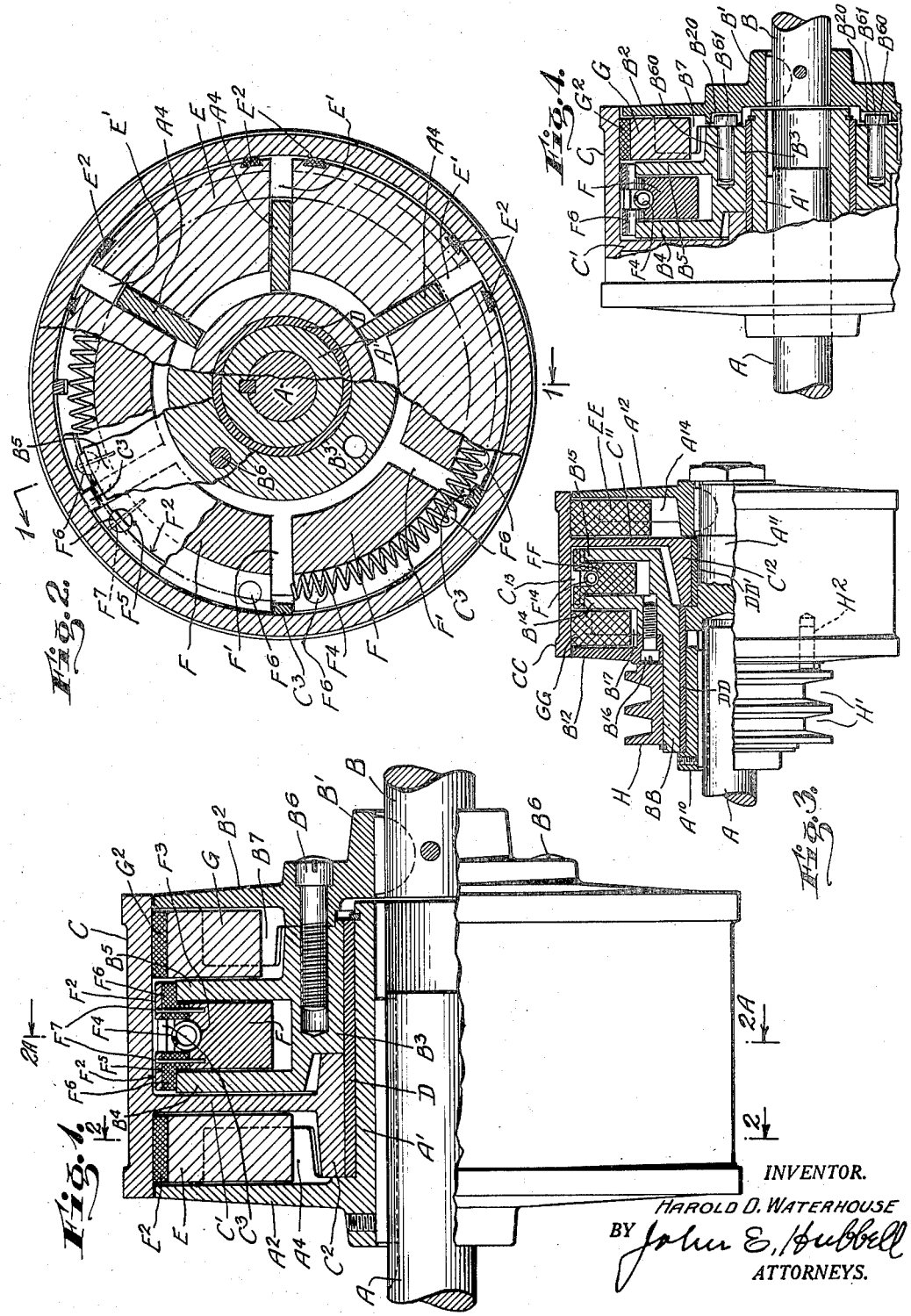

2,027,941

UNITED STATES PATENT OFFICE 2,027,941

CLUTCH MECHANISM

Harold D. Waterhouse, Rochester, N. Y.

Application August 16, 1933, Serial No. 685,328

7 Claims. (Cl. 192—103)

The general object of the present invention is to provide an improved mechanism for connecting driving and driven elements and was primarily devised and is especially adapted for use in connecting the shaft of an electric motor to a driven element in such manner that the motor may impress a driving torque on the driven element in starting the latter into operation which is substantially in excess of the normal running speed load torque, and that the connection may yield when the running speed load becomes excessive, to permit the driven element to stop without much if any reduction in motor speed, and which will thereafter permit the motor to run idle at its normal no load speed until the motor control mechanism is actuated to first stop the motor and then restart it into operation.

The invention is especially useful, as those skilled in the art will understand, in connection with motors such as modern "squirrel cage" motors which can safely develop a driving torque at starting speeds substantially in excess of that which if required to carry the load at higher speeds would result in injury to the motor.

A mechanism having the above mentioned operating characteristics has heretofore been devised by me, and forms the subject matter of my Patent 1,927,509, granted September 19, 1933. The mechanism of my said prior application is characterized in particular by the inter-position of two separate clutch mechanisms between the driving and driven elements, one of said clutch mechanisms coupling the driving and driven elements during low starting speeds, but being rendered inoperative by centrifugal force action as the speed of the driven element approaches normal running speeds, while the other clutch mechanism is not effective to carry the load at low starting speeds, but is rendered operative to carry the load by centrifugal force action as the speed of the driven element approaches normal running speeds. Specific objects of the present invention are to provide a connecting mechanism having the general structure and operating characteristics and advantages of the clutch mechanism of said prior application, and possessing the additional advantage of permitting some slippage of the driven element relative to the driving element in the initial starting operation, to thereby avoid undue shock in initially starting the driven element into rotation. The present invention also comprises certain specific improvements in construction and arrangement of connecting mechanism parts.

The various features of novelty which characterize my invention are pointed out with particularity in the claims annexed to and forming a part of this specification. For a better understanding of the invention, however, its advantages and specific objects attained with its use reference should be had to the accompanying drawing and descriptive matter in which I have illustrated and described preferred embodiments of the present invention.

Of the drawing:

Fig. 1 is an elevation with its upper portion in section on the line 1—1 of Fig. 2;

Fig. 2 is a partial transverse section with its righthand portion taken on the line 2—2, and its lefthand portion taken on the line 2A—2A of Fig. 1;

Fig. 3 is a view taken similarly to Fig. 1 illustrating a modified construction; and Fig. 4 is a view taken similarly to Fig. 1 illustrating another modification.

In the drawing and referring first to Figs. 1 and 2, A represents a motor armature or other driving shaft and B represents a driven shaft in axial alignment with the shaft A. Secured to the shaft A and forming a part of the driving element is a member having an elongated hub portion A' and a radial flange A². A member forming a part of the driven element and comprising a hub part B' surrounding and suitably secured to the driven shaft B, has a radially extending flange portion B². The latter is spaced away from the driving element flange A² and unites with the latter to form the end walls of a clutch housing. The outer wall of said housing is formed by the cylindrical body portion of a member C which may be called the floating element or member of the improved mechanism. As shown the ends of the cylindrical body portion of the floating member C surround the peripheral edges of the flanges A² and B², each of which may rotate relative to the member C under certain conditions, though in normal operation, the shafts A and B turn together and each is coupled to the member C so that there can then be no relative motion between the member C and either of the flanges A² and B².

The member C comprises an internal annular rib or flange C' adjacent but spaced away from the flange A². The ribs C' terminates at its inner edge in a hub portion C² surrounding and journalled on the hub portion A'. The driven element also comprises a member having a hub portion B³ in end to end relation with the hub portion C² which surrounds and is journalled on the hub portion A' of the driving element, and which comprises two spaced apart radial flange portions $B^4$ and $B^5$. The flange portion $B^4$ is shown as adjacent the flange $C'$ of the member C, and the flange $B^5$ is between and spaced away from each of the flanges $B^4$ and $B^2$.

Within separate compartments or annular spaces in the said clutch housing are mounted the radially movable clutch segments E, F and G of three corresponding clutch mechanisms. The segments E are arranged in a circular series in the annular space between the flanges $A^2$ and $C'$, and each segment E is free to move radially away from the axis of the shaft A under centrifugal force as required to bring the peripheral edges of the segments E into frictional driving engagement with the corresponding end of the inner surface of the cylindrical portion of the member C. Each segment E has each of its ends spaced away from the adjacent end of the adjacent segment to provide a radial slot or space $E'$ to receive and provide a suitable small clearance for a corresponding radially extended drive rib $A^4$ carried by the flange $A^2$, and guiding the segment in its radial movement and interlocking it with the driving element for continuous rotation therewith.

The segments F are arranged in a circular series between the driven element flanges $B^4$ and $B^5$ and are guided in their radial movement and interlocked against rotation relative to the floating member C, in the arrangement shown, by virtue of the fact that longitudinally extending ribs $C^3$ carried by the member C at the inner side of the central portion of its cylindrical body portion extend into the spaces $F'$ between the adjacent ends of adjacent segments F. Each segment F is formed at its opposite sides, in the construction illustrated, with corresponding circumferentially extending or cylindrical flange portions $F^2$ which surround the flanges $B^4$ and $B^5$ of the driven element. A circumferentially extending spring element $F^4$, which may be called a garter spring, received in circumferentially extending groove portions $F^3$ formed in the segments F between their oppositely extending flange portions $F^2$, tends to hold the latter in frictional engagement with the peripheral edges of the flanges $B^4$ and $B^5$, and thereby frictionally couple the driven element to the float element C. The tension of the spring $F^4$ is not great enough, however, to resist the radial outward movement of the segments F under centrifugal force action when the speed of the floating element C equals or exceeds a certain speed somewhat below the normal running speed.

The segments G extend in a circular series in the space between the flanges $B^5$ and $B^2$. The segments G are radially movable under centrifugal force action into driving frictional engagement with the corresponding end of the inner surface of the cylindrical portion C of the floating element. The segments G are held against angular movement relative to the driven element by projections $B^7$ from the flange part $B^2$, which extend into the spaces between the ends of the segments G, as the ribs $A^4$ projecting from the flange $A^2$ extend into the corresponding spaces $E'$ between the segments E. The segments G may be, and are shown as substantially identical in construction with the segments E, but should be so disposed or of such weight that they are not effective to transmit the driving torque except at a speed of the driven element in excess of that at which the segments F operatively couple the driving element to the floating member C.

With the described construction, when the parts are at rest, the floating element C is coupled to the driven element by the segments F which then have their flanges $F^2$ held in frictional engagement with the peripheral edges of the flanges $B^4$ and $B^5$ by the spring $F^4$ but the floating element is not then coupled to the driving element. When the motor shaft A starts into operation, the segments E move outward under centrifugal force action, and in accordance with the present invention, the segments E are so disposed and weighted that they impress the desired starting torque on the member C while the speed of the driving element is still considerably below its normal running speed, so that the floating element C is started into rotation almost immediately after the shaft A starts into rotation. As the floating element C is started into rotation, the driven element turns with it under the action of the clutch mechanism including the segments F, which has its maximum effectiveness when the driven element is at rest. As the speed of the driven element increases, centrifugal action on the segments F opposes the action of the spring $F^4$ and first diminishes and later eliminates the torque transmitting capacity of the segments F which cease to operatively engage the flanges $B^4$ and $B^5$ at a predetermined speed below any normal running speed of the driven element but exceeding that at which the driving and floating elements are operatively connected by the segments E. At the driven element speed at which the segments F lose their torque transmitting capacity, the segments G, which rotate with the driven element, are effective to carry the normal load.

The segments G are so disposed and weighted that while the driving torque which they are capable of transmitting progressively increases as the speed of the driven element increases and is great enough to carry the normal load at the speed at which the segments F become inoperative and at higher speeds, the torque transmitting capacity of the segments G at any normal running speed does not exceed the predetermined maximum load desirably impressed upon the driving element at the last mentioned speed. In consequence, when an undesirable overload occurs at normal running speeds, slippage between the segments G and the floating member C results. In consequence of such slippage, the driven element immediately loses speed. Such speed reduction diminishes the effectiveness of the clutch mechanism including the segments G, and the driven element is permitted to stop without a reduction in the speed of the driving element sufficient to permit the spring $F^4$ to bring the segments F into effective frictional engagement with the driven element. On the development of the undesirable overload, the speed of the driving shaft is reduced only momentarily and slightly, and as the driven element slows down and stops, the motor speed quickly builds up to its normal idling or no load running speed, so that the overload does not stall or injure the driving motor. As will be apparent, the required extent of radial movement of the clutch parts E, F, and G is quite small.

If the floating element C of the construction shown in Figs. 1 and 2 were permanently and rigidly connected to the driving element thereby rendering the segments E functionless, the mechanism of Figs. 1 and 2 would not differ in general operative capacity and principle from that of my prior patent. The combination of the floating element C and the segments F for coupling it to the driving element, with the mechanism of my prior patent gives the functional capacity and advantage of allowing sufficient slippage between the driven and driving elements in starting to avoid starting shocks inevitable, and seriously objectionable in some cases, with the clutch mechanism of the precise form disclosed in my prior patent.

The clutch mechanism illustrated in Figs. 1 and 2 is characterized by its simplicity of construction and the relative ease with which it may be formed, assembled and disassembled. To facilitate assemblage and disassemblage as well as the machining of the parts, the driven element part including the hub B' and the flange B² is made separable from the part including the hub B³ and flanges B⁴ and B⁵, and those parts are rigidly connected in the assembled mechanism by axially extending screws B⁶. A bearing sleeve D is advantageously interposed between driving element hub portion A' and the surrounding hubs C² and B³ of the floating and driven elements, respectively.

While the segments E, F and G may be made in various forms and of various materials, and in particular may be made of practically any material suitable for use as a brake lining material in contact with the metals of which the element C and the flanges B⁴ and B⁵ are formed, the segments are shown in Figs. 1 and 2 as made mainly of metal with attached frictional engaging parts of brake lining material, such as molded material of asbestos, rubber or the like reinforced with wire mesh. As shown, the brake lining material parts E² so attached to the segments F are in the form of tapered bars received in axially extending dovetail slots in the segment bodies and have cylindrical outer surface portions coaxial with the shaft A and projecting suitably beyond the peripheral edges of the metallic body portions of the segments E. The segments G may have and are shown as having brake lining parts G² similar to the parts E², at their peripheral edges.

As shown, the metallic body portions of the segments F have axially extending holes drilled or otherwise formed in them adjacent their peripheral edges to provide receiving spaces F⁵ for brake lining material parts F⁶. The spaces F⁵ are arranged in end to end pairs at opposite sides of the groove F³, the diameter of each of said spaces exceeding the radial distance from its outer edge to the concave inner edge of the corresponding flange F², so that the portion of the space within the flanges is in the form of a rounded slot open at its side adjacent the shaft axis.

The molded brake lining material part F⁶ mounted in each of said spaces F⁵ may be initially in the form of a rod filling the closed portion of the space and extending inwardly from the open slot portion of the passage, and being subsequently turned off at the inner sides of the corresponding flange F². The brake lining parts F⁶ may be anchored in place as shown by radial pins F⁷ driven into radial holes formed for the purpose in the segments F.

The general features of the present invention may be utilized in clutch mechanisms differing materially in form from that shown in Figs. 1 and 2, one such modification being illustrated by way of example in Fig. 3. In Fig. 3 the driving shaft A has secured to it a driving element part A¹⁰ comprising a sleeve portion surrounding the ends of the shaft A and a shaft-like portion in axial alignment with the shaft A. The latter has secured to its outer end the hub portion of a member A¹² which also comprises a radial flange corresponding in purpose and generally in form to the flange A³ of the construction first described and provided with radially extending ribs A¹⁴ engaging the segments EE as the ribs A⁴ engage the segments E. The segments EE form part of an automatic starting clutch mechanism which correspond in function and may be identical in form and in the manner of their coaction with the floating element CC, with the segments E of Figs. 1 and 2 and their relation to the floating element C of Figs. 1 and 2.

The floating element CC of Fig. 3 is identical in substance with the floating element C of Figs. 1 and 2, but differs therefrom as shown in the form and disposition of its flange and hub portions C¹¹ and C¹². The latter, as shown, surrounds and is journalled on a portion of the shaft portion A¹¹ of the member A¹⁰ intermediate in diameter between the portions thereof respectively surrounding the shaft A and surrounded by the member A¹². A bearing sleeve DD' is interposed between the hub C¹² and the member A¹⁰. In Fig. 3, the driven element comprises a part having a radial flange B¹² corresponding generally to the flange B² of the construction first described which surrounds the elongated hub portion of a part BB. Said hub portion surrounds the sleeve portion of the member A¹⁰, DD representing a bearing sleeve interposed between the part BB and the member A¹⁰.

The member BB and the part including the flange B¹² are detachably connected by screws B¹⁶, and the member BB is formed with flanges B¹⁴ and B¹⁵ corresponding to the flanges B⁴ and B⁵ first described. The flange B¹⁴ of Fig. 3 is formed with radial ribs B¹⁷ engaging the adjacent segments GG as the ribs B⁷ engage the segments E in the construction first described. The segments FF of Fig. 3 are similar in shape to the segments F of the construction first described, and have their inner portions between the flanges B¹⁴ and B¹⁵, and are held against angular movement relative to the floating member CC by internal ribs C¹³ of the latter, corresponding to the ribs C³ of the construction first described. The segments EE, FF and GG of Fig. 3 may be identical in construction with the segments E, F and G of Figs. 1 and 2, but as shown they omit the brake lining parts E², F⁷ and G² and may be made each of a single piece of metal, or, as shown, of brake lining material in which lead or other weighting material may be incorporated if necessary.

In Fig. 3, the segments FF are held in frictional engagement with the peripheral edges of the flanges B¹⁴ and B¹⁵ by a garter spring F⁴, as in the construction first described. In Fig. 3 a driven pulley element H formed with side by side pulley grooves H' is mounted on the hub portion of the member BB and serves to transmit power from the latter to the mechanism operatively connected to and driven by the driven element of the coupling mechanism. As shown, rotation of the pulley H relative to the member BB is prevented by one or more driving pins H² connecting those parts. The operation of the mechanism shown in Fig. 3 is identical in principle with that of the mechanism shown in Figs. 1 and 2.

The arrangement shown in Figs. 1, 2 and 3, tends to maintain the driven shaft in rigid alignment with the driving shaft. In some cases, however, it may be desirable to employ the clutch mechanism in connecting driving and driven shafts which are not in true alignment, but have their axes laterally displaced from one another by a small amount or slightly out of parallelism. Such misalignment of the driving and driven shafts may be accommodated, for example by the modification illustrated in Fig. 4. In the arrangement shown in Fig. 4, in lieu of the screws $B^6$ rigidly clamping the flange $B^2$ to the hub $B^3$ in Figs. 1 and 2, similarly positioned driving pins $B^{60}$ rigidly secured to the hub portion $B^3$ have squared ends $B^{61}$ entering radial slots $B^{20}$ formed in the adjacent side of the flange $B^2$. The pins $B^{60}$ may have a driving fit with the walls of the sockets formed in the hub portion $B^3$ to receive them. The circumferential width or the thickness of the squared ends $B^{61}$ of the driving pins may be slightly less than the corresponding width of the slots $B^{22}$, thereby providing clearance to accommodate varying degrees of misalignment of the driving and driven shaft. Any theoretical imperfection in the driving connection between the misaligned parts formed by the simple pin and slot arrangement illustrated in Fig. 4 is of small practical significance, because of the relatively small amount of work done by this driving connection, since, when the driven member is brought up to normal speed, the driving torque is transmitted thereto not through the driving pins, but through the connection between the floating member C and the flange $B^2$ formed by the segments G and ribs $B^7$.

With each segment E between corresponding radial ribs $A^4$, the driving force is applied to each segment through the rib $A^4$ at the rear of the segment, and the tendency of the segment to cant or tilt is minimized. A further advantage of this arrangement is that it minimizes the machining work required, since it permits all of the segments of a set to be formed from an integral annulus from which the segments may be cut by simple milling operations after the annulus has been machined. Furthermore, with this arrangement, it is unnecessary in general to accurately machine the sides of the rib $A^4$. The same general advantages are obtained by locating the ribs $F^2$ between the ends of the segments F, and by locating the ribs $B^7$ between the adjacent ends of adjacent segments E. In the latter case, the driving force is transmitted by the front end of each segment G to the adjacent side of the adjacent rib $B^7$.

In the particular form of construction illustrated in my above mentioned prior patent, the clutch mechanism by which the driven element is started into rotation, is of the cone clutch type and may occasionally give trouble because of the failure of the conical clutch surfaces to disengage as soon as the centrifugal force action of the segments of the mechanism becomes as great as the opposing action of the garter spring. With the form of the corresponding clutch mechanism illustrated herein, this difficulty is avoided, as the segments F and FF move directly outward from the cylindrical bearing surfaces formed by the peripheral edges of the flanges $B^4$ and $B^5$, and $B^{14}$ and $B^{15}$, respectively, as soon as the centrifugal force action on the segments exceeds the centripetal action of the garter spring.

While in accordance with the provisions of the statutes, I have illustrated and described the best forms of my invention now known to me, it will be apparent to those skilled in the art that changes in the form of the apparatus disclosed may be made without departing from the spirit of my invention as set forth in the appended claims and that in some cases certain features of my invention may be used to advantage without a corresponding use of other features.

Having now described my invention, what I claim as new and desire to secure by Letters Patent, is:

1. A device of the class described comprising in combination a driving member, a driven member, a floating member, two independently operating clutch mechanisms operatively interposed between the floating and driven members, one of said mechanisms being effective at floating member starting speeds and including means rendering it ineffective at normal operating speeds of the floating member and the other of said mechanisms being ineffective at driven member starting speeds and including means making it effective at normal driven member speeds, and a third clutch mechanism ineffective when the driving member is at rest but rendered effective to cause said floating member to rotate with the driving element by a driving member speed below normal running speeds.

2. A device of the class described comprising in combination a driving member, a driven member, a floating member, a clutch mechanism rendered effective by centrifugal force action to transmit the maximum torque from the driving element to the floating member required to cause the latter to rotate with the driving element at all speeds in excess of low starting speeds but permitting slippage at the last mentioned speeds, and second and third clutch mechanisms operatively interposed between said floating member and driven member, said second mechanism operatively coupling the floating element with the driven element during starting speeds of the latter, but being rendered inoperative by a floating member speed less than normal running speeds, and said third mechanism being ineffective at low speeds of the driven element, but being rendered effective to transmit the normal load torque from the floating member to the driven member at normal running speeds of the latter equal to and in excess of said driven element speed and yielding when the load becomes excessive to permit the stoppage of the driven member without sufficient reduction in the driving and floating member speeds to render said second mechanism operative to recouple said floating and driven members.

3. A device of the class described comprising in combination a driving member, a driven member, a floating member, and three clutch mechanisms each including means responsive to centrifugal force action dependent on the rotative speed of the mechanism, one of said mechanisms being effective to transmit the maximum torque from the driving element to the floating member required to cause the latter to rotate with the driving element at all speeds in excess of low starting speeds but permitting slippage at the last mentioned speeds, a second of said clutch mechanisms operatively interposed between said floating member and driven member and operatively coupling the floating element with the driven element during starting speeds of the latter, but being rendered inoperative by a floating member speed less than normal running speeds, and the third of said mechanisms being operatively interposed between said floating and driven members and being ineffective at low speeds of the driven element, but being rendered effective to transmit the normal load torque from the floating element to the driven element at any speed of the latter not less than that at which said second clutch mechanism becomes inoperative.

4. A device of the class described, a driving member, a driven member, a floating member, and comprising in combination, separate clutch devices rotated by each of said members and subjected to centrifugal force action by such rotation, the clutch devices rotating with the driving member acting on the floating member to cause the latter to rotate with the driving member at all speeds of the latter above initial starting speeds at which slippage of the driving member relative to the floating member is permitted, the clutch devices rotating with the floating member acting on the driven member and tending to turn the latter with the floating member at all speeds of the latter below a certain speed which is less than normal running speeds and being inoperative to turn the driven member at speeds of the floating member higher than said certain speed, and the clutch devices rotating with the driven member forming a coupling connection between the floating and driven member tending to cause them to rotate together, the effectiveness of said connection increasing with the speed of the driven member and being sufficient to transmit the normal load torque at running speeds, but being insufficient to prevent the driven member from slowing down and stopping under overloads without reducing the speed of the floating member sufficiently to cause the clutch devices rotating with the floating member to operatively couple the latter to the driven member.

5. A device of the class described comprising in combination, a driving member and coaxial floating and driven members, said driving and driven members including spaced apart radial flanges forming the ends of a clutch housing and said floating member including a cylindrical portion forming the outer portion of said housing, three separate sets of clutch devices responsive to centrifugal force action, the devices of one set rotating with the driving member and operatively coupling the floating member thereto for rotation of the latter with the driving member at all speeds of the latter member above its initial starting speeds, the devices of a second set rotating with the floating member and operatively coupling the latter to the driven member at low speeds of the floating member, but being operatively disconnected from the driven member at a speed of the floating member somewhat below normal running speeds, and the devices of the third set rotating with the driven member and providing a coupling connection between the latter and the floating member, the effectiveness of which increases with the speed of the driven member and which is effective to transmit the normal load torque at running speeds, but which yields on overloads to permit the driven member to slow down and stop without reducing the speed of the floating member sufficiently for the devices of the second set to operatively recouple the floating and driven members.

6. A device of the class described comprising in combination, a driving member and coaxial floating and driven members, said driving and driven members including spaced apart radial flanges forming the ends of a clutch housing and said floating member including a cylindrical portion forming the outer portion of said housing said members including other radial flange portions dividing the interior of said housing into three annular spaces, a separate set of clutch devices responsive to centrifugal force action mounted in each of said spaces, the devices of one set rotating with the driven member and operatively coupling the floating member thereto for rotation of the latter with the driving member at all speeds of the latter above its initial starting speeds, the devices of a second set rotating with the floating member and operatively coupling the latter to the driven member at low speeds of the floating member, but being operatively disconnected from the driven member at a speed of the floating member somewhat below normal running speeds, and the devices of the third set rotating with the driven member and providing a coupling connection between the latter and the floating member the effectiveness of which increases with the speed of the driven number and which is effective to transmit the normal load torque at running speeds, but which yields on overloads to permit the driven member to slow down and stop without reducing the speed of the floating member sufficiently for the devices of the second set to operatively recouple the floating and driven members.

7. A device of the class described comprising in combination a driving member, a driven member, a floating member, two independently operating clutch mechanisms operatively interposed between the floating and driven members, one of said mechanisms being effective at floating member starting speeds and including means rendering it ineffective at normal operating speeds of the floating member and the other of said mechanisms being ineffective at driven member starting speeds and including means making it effective at normal driven member speeds, and a third clutch mechanism ineffective when the driving member is at rest but rendered effective to cause said floating member to rotate with the driving element by a driving member speed below normal running speeds, said driven member comprising a body portion, a second portion coaxial with and journalled on the driving member and a non-rigid driving connection coupling said second portion to said body portion and permitting misalignment of the latter with respect to the driving member.

HAROLD D. WATERHOUSE.